United States Patent
Wolf et al.

(10) Patent No.: US 8,307,368 B2
(45) Date of Patent: Nov. 6, 2012

(54) LOCALITY-BASED SCHEDULING IN CONTINUATION-BASED RUNTIMES

(75) Inventors: Kenneth D. Wolf, Seattle, WA (US);
Nathan C. Talbert, Seattle, WA (US);
Edmund Samuel Victor Pinto, Duvall, WA (US); Justin David Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 12/472,200

(22) Filed: May 26, 2009

(65) Prior Publication Data

US 2010/0306778 A1    Dec. 2, 2010

(51) Int. Cl.
*G06F 9/46* (2006.01)
*G06F 9/455* (2006.01)

(52) U.S. Cl. ............................................ 718/103; 718/1
(58) Field of Classification Search .............. 718/1, 102, 718/104, 103; 716/101
See application file for complete search history.

(56) References Cited

U.S. PATENT DOCUMENTS

| | | | |
|---|---|---|---|
| 7,444,620 B2 | 10/2008 | Marvin | |
| 7,464,366 B2 | 12/2008 | Shukla | |
| 7,882,236 B2 * | 2/2011 | Lovering et al. | 709/227 |
| 2002/0078421 A1 * | 6/2002 | Bradley et al. | 716/1 |
| 2003/0033411 A1 * | 2/2003 | Kavoori et al. | 709/226 |
| 2003/0120825 A1 * | 6/2003 | Avvari et al. | 709/316 |
| 2003/0126136 A1 * | 7/2003 | Omoigui | 707/10 |
| 2003/0191795 A1 * | 10/2003 | Bernardin et al. | 709/105 |
| 2005/0099646 A1 * | 5/2005 | Jeyachandran et al. | 358/1.14 |
| 2005/0240930 A1 | 10/2005 | Amamiya | |
| 2006/0195846 A1 * | 8/2006 | Benedetti | 718/102 |
| 2007/0214457 A1 * | 9/2007 | Goyal et al. | 718/101 |
| 2007/0233969 A1 | 10/2007 | Shukla | |
| 2007/0234129 A1 | 10/2007 | Shukla | |
| 2007/0239498 A1 | 10/2007 | Shukla | |
| 2007/0239499 A1 | 10/2007 | Shukla | |
| 2007/0239505 A1 | 10/2007 | Shukla | |
| 2008/0016508 A1 * | 1/2008 | Goto et al. | 718/102 |
| 2009/0077573 A1 | 3/2009 | Moorthy | |
| 2009/0177671 A1 * | 7/2009 | Pellegrini et al. | 707/100 |
| 2009/0313624 A1 * | 12/2009 | Duffy et al. | 718/100 |

OTHER PUBLICATIONS

Kusakabe, et al.; "Scalability of Continuation-based Fine-grained Multithreading in Handling Multiple I/O Requests on Fuce"; May 7-9, 2007; pp. 225-235; http://delivery.acm.org/10.1145/1250000/1242564/p225-kusakabe.pdf?key1=1242564&key2=2917218321&coll=GUIDE&dl=GUIDE&CFID=28463444&CFTOKEN=11762334.

Conery; "Continuation Based Control in the Implementation of Parallel Logic Programs"; 1994; pp. 1-23; http://www.cs.uoregon.edu/~conery/PDF/ConeryLASC94.pdf.

(Continued)

*Primary Examiner* — Thomas Lee
*Assistant Examiner* — Phil Nguyen
(74) *Attorney, Agent, or Firm* — Workman Nydegger (57) ABSTRACT

A computer system establishes an execution environment for executing activities in a continuation based runtime including instantiating an activity scheduler configured to perform the following: scheduling activities for execution in the CBR. The activity scheduler resolves the scheduled activity's arguments and variables prior to invoking the scheduled activity using the activity's unique context. The activity scheduler also determines, based on the activity's unique context, whether the scheduled activity comprises a work item that is to be queued at the top of the execution stack and, based on the determination, queues the work item to the execution stack. The computer system executes the work items of the scheduled activity as queued in the execution stack of the established execution environment in the CBR.

20 Claims, 4 Drawing Sheets

OTHER PUBLICATIONS

Dutchyn; "Specializing Continuations a Model for Dynamic Join Points"; Mar. 13, 2007; pp. 45-57; http://delivery.acm.org/10.1145/1240000/1233840/p45-dutchyn.pdf?key1=1233840&key2=6134712911&coll=GUIDE&dl=GUIDE&CFID=38693618& CFTOKEN=41733587.

Lane; "Best Practices for Windows Workflow Foundation Apps"; 2009; pp. 1-6; http://msdn.microsoft.com/en-us/magazine/dd252947.aspx#id0100048.

Kusakabe, et al.; "OS Mechanism for Continuation-based Fine-grained Threads on Dedicated and Commodity Processors"; 2007; pp. 1-10; http://ieeexplore.ieee.org/stamp/stamp.jsp?arnumber=04228406.

Box, et al.; "Simplify Development with the Declarative Model of Windows Workflow Foundation"; 2009; pp. 1-12; http://msdn.microsoft.com/en-us/magazine/cc163661.aspx.

* cited by examiner

LOCALITY-BASED SCHEDULING IN CONTINUATION-BASED RUNTIMES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

One type of software is referred to as a "runtime". A runtime generally provides underlying functionality that can be used by multiple different applications that run on a computing system. Some runtimes may be configured to execute activities. An activity generally represents a unit of executable code that may be part of a software application or part of an application function. As activities are executed, the runtime may be configured to track when each activity was executed and, in some cases, identify program state before and after execution.

BRIEF SUMMARY

Embodiments described herein are directed to establishing an execution environment for executing activities in a continuation based runtime. In one embodiment, a computer system establishes an execution environment for executing activities in a continuation based runtime (CBR). Establishing the execution environment includes instantiating an activity scheduler configured to perform the following: scheduling activities for execution in the CBR, where each scheduled activity is associated with at least one work item and unique context information corresponding to the work item, and where the scheduling includes adding the activity's work items to an execution stack and tracking pending activity work items to determine when the scheduled activity has reached at least one of a plurality of completed states.

The activity scheduler resolves the scheduled activity's arguments and variables prior to invoking the scheduled activity using the activity's unique context. The activity scheduler also determines, based on the activity's unique context, whether the scheduled activity comprises at least one work item that is to be queued at the top of the execution stack and, based on the determination, queues the work item to the execution stack. The computer system executes the work items of the scheduled activity as queued in the execution stack of the established execution environment in the CBR.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to establishing an execution environment for executing activities in a continuation based runtime. In one embodiment, a computer system establishes an execution environment for executing activities in a continuation based runtime (CBR). Establishing the execution environment includes instantiating an activity scheduler configured to perform the following: scheduling activities for execution in the CBR, where each scheduled activity is associated with at least one work item and unique context information corresponding to the work item, and where the scheduling includes adding the activity's work items to an execution stack and tracking pending activity work items to determine when the scheduled activity has reached at least one of a plurality of completed states.

The activity scheduler resolves the scheduled activity's arguments and variables prior to invoking the scheduled activity using the activity's unique context. The activity scheduler also determines, based on the activity's unique context, whether the scheduled activity comprises at least one work item that is to be queued to the execution stack and, based on the determination, queues the work item at the top of the execution stack. The computer system executes the work items of the scheduled activity as queued in the execution stack of the established execution environment in the CBR.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
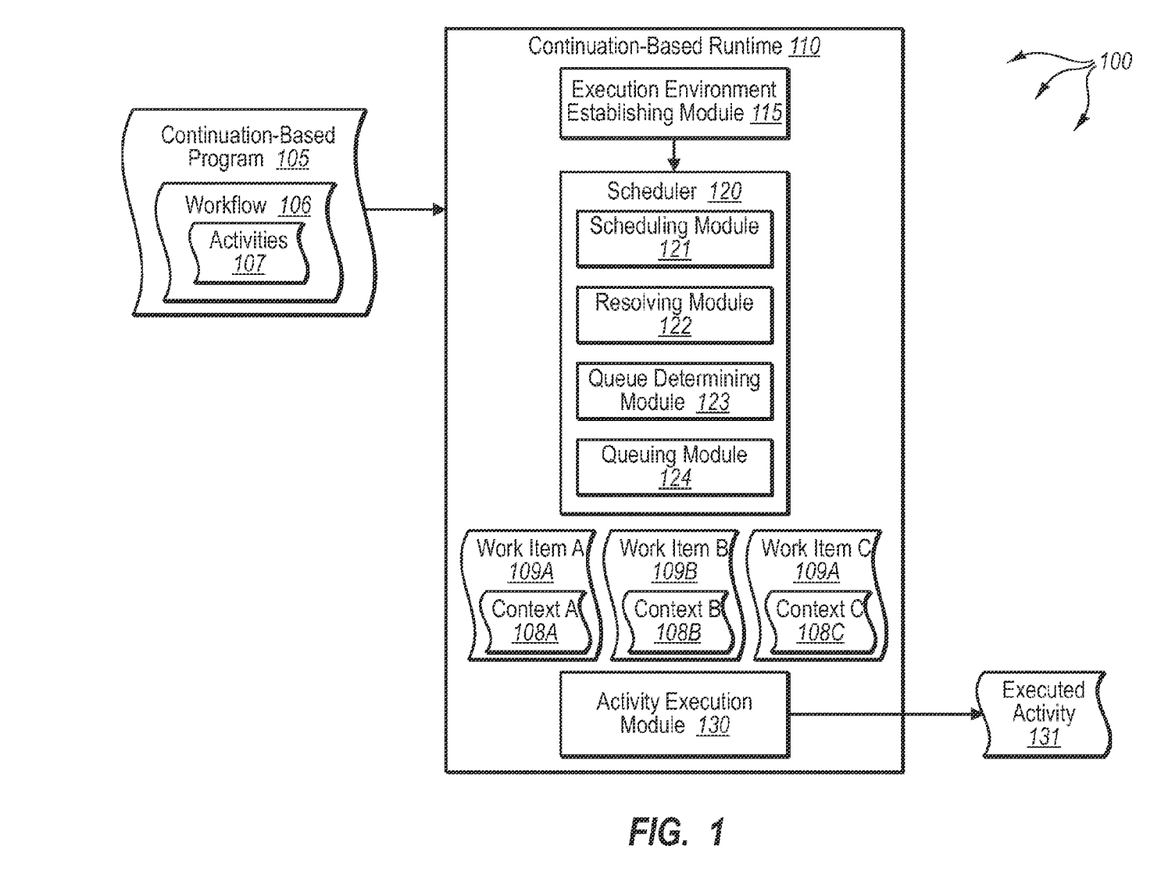
FIG. 1 illustrates a computer architecture in which embodiments of the present invention may operate including establishing an execution environment for executing activities in a continuation based runtime.

FIG. 1 illustrates a computer architecture 100 in which the principles of the present invention may be employed. Computer architecture 100 includes continuation-based runtime 110. Continuation based runtime 110 executes activities (e.g. 107). As used herein, an activity represents a unit of executable code including one or more work items. One of the ways an activity can execute multiple work items is through the scheduling of child activities. This composition of activities enables custom control flows that can be implemented through the scheduling of child activities 0, 1 or n times as determined by the composite activity.

An activity can also setup a resumable continuation in its execution that is resumed by a stimulus external to the runtime. The continuation-based runtime (CBR) may interpret this external stimulus as another item of work to be handled by the activity. Work items are represented internally as continuations that the runtime invokes on activities. Beyond this flexibility to create control flows and handle external resumptions, activities have the following characteristics: they have no process affinity (i.e. they can be paused and resumed in a different process), they have no thread affinity (i.e. different items of work can be run on different threads), and they can be stored and reloaded at a later point in time.

Continuation-based runtime 110 may be configured to execute activities 107 which are part of a continuation-based program 105. Program 105 includes workflow 106 which includes activities 107. It should be understood that program 105 may include multiple workflows, multiple activities, multiple work items, etc. In some embodiments, CBR 110 may establish an execution environment for executing program 105 using execution environment establishing module 115. The execution environment may include scheduler 120 which includes modules 121-124. CBR 110 also includes various work items associated with one or more activities that are scheduled when the work item's corresponding activity is scheduled. Each of the work items is executed within a unique context. Accordingly, work item A (109A) may be executed within unique context A (108A), work item B (109B) may be executed within unique context B (108B) and work item C (109C) may be executed within unique context C (108C). Although three work items are shown, virtually any number of work items is possible. The scheduling of work items, as well as the functionality of modules 121-124 will be explained in greater detail below with regard to FIG. 2. Upon scheduling the activity for execution, activity execution module 130 then executes execute the activity, resulting in executed activity instance 131.

Figure 3:
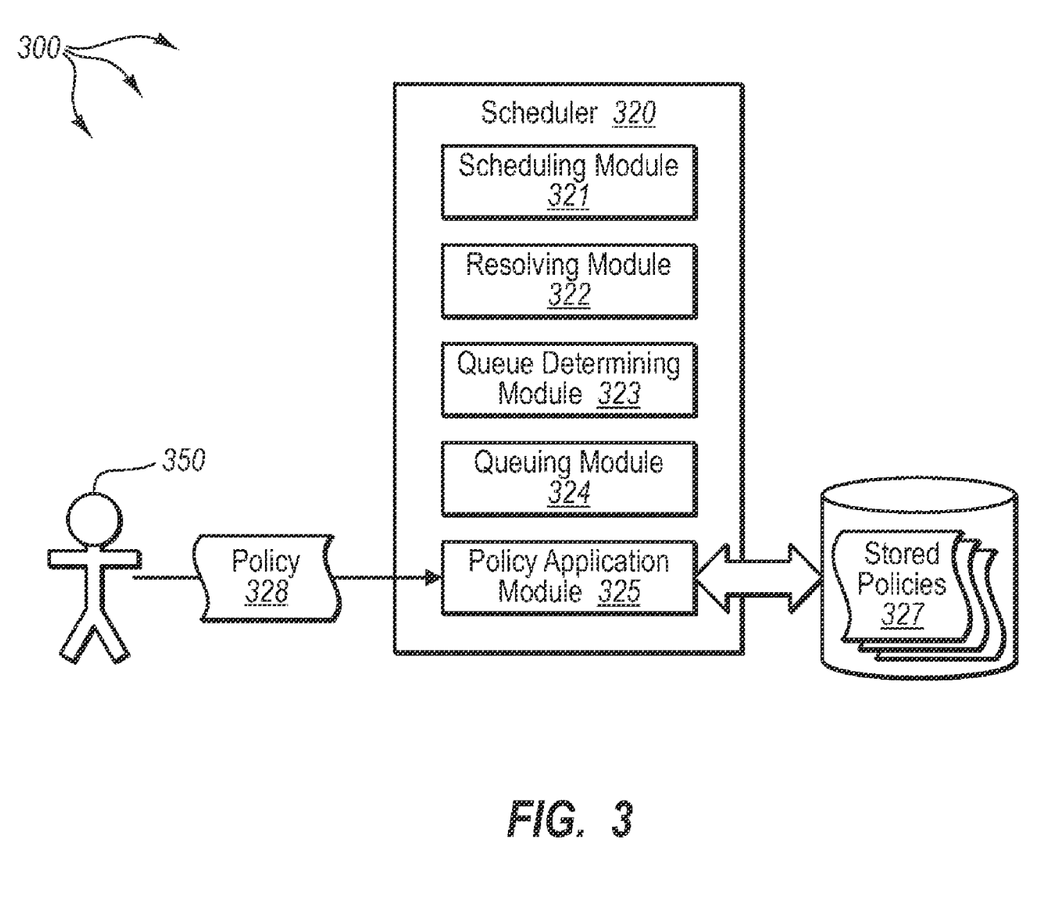
FIG. 3 illustrates an embodiment of an activity scheduler.

As illustrated in FIG. 3, the scheduler 320 may, in addition to modules 321-324 (which, at least in some embodiments, correspond to modules 121-124 of FIG. 1) include a policy application module 325. Policy application module 325 may be configured to apply various policies during scheduling and/or execution of an activity. The policies may affect how or when an activity is executed and may affect the activity's execution context. In some cases, the policies 328 are received from a user 350. In other cases, the policies are retrieved from stored policies 327 stored in a database or other form of data store. Policies regarding various activity operations may be applied dynamically. Activity operations controllable by policy include at least the following: activity execution, continuation, completion, cancellation and exception handling. These and other policy-controllable operations will be explained in greater detail below.

Figure 2:
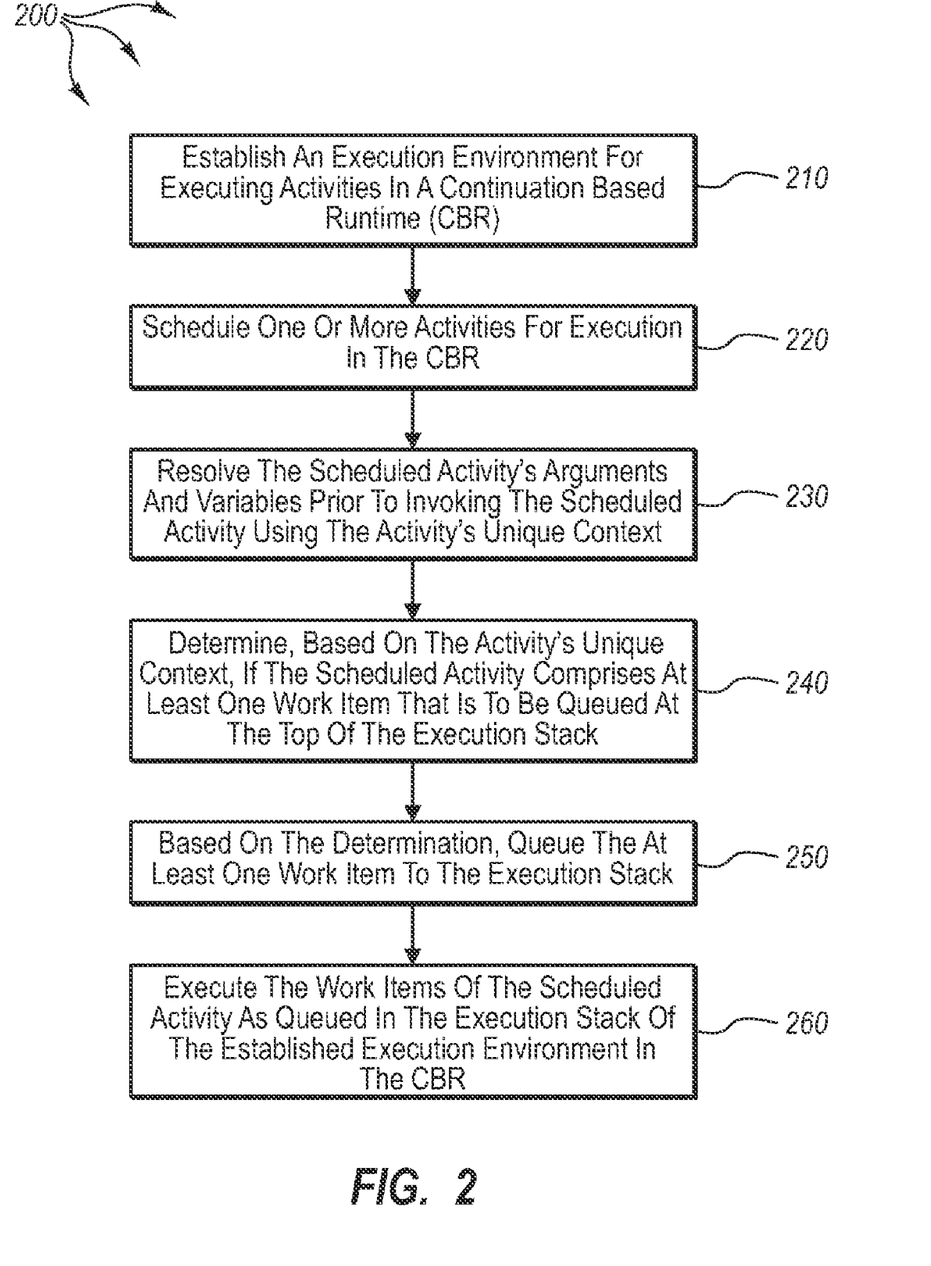
FIG. 2 illustrates a flowchart of an example method for establishing an execution environment for executing activities in a continuation based runtime.

FIG. 2 illustrates a flowchart of a method 200 for establishing an execution environment for executing activities in a continuation based runtime. The method 200 will now be described with frequent reference to the components and data of environments 100, 300 and 400 of FIGS. 1, 3 and 4, respectively.

Method 200 includes an act of establishing an execution environment for executing activities in a continuation based runtime (CBR), wherein establishing the execution environment comprises instantiating an activity scheduler configured to perform the following (act 210). For example, execution environment establishing module 115 may establish an execution environment for executing activities 107 in CBR 110. The execution environment is designed to be performant, predictable, complete. That is, the execution environment should perform a predetermined level of functionality, be predictable in how activities and corresponding work items are executed, and be sufficiently complete to be able to handle the execution of multiple different types of activities. Establishing the execution environment may include instantiating activity scheduler 120 configured to perform different operations using the various modules 121-124. These operations will be described in acts 220-250 below.

Method 200 includes an act of scheduling one or more activities for execution in the CBR, wherein each scheduled activity is associated with at least one work item and unique context information corresponding to the work item, the scheduling including adding the activity's work items to an execution stack and tracking pending activity work items to determine when the scheduled activity has reached at least one of a plurality of completed states (act 220). For example, scheduling module 121 may schedule activity 107 for execution in CBR 110. Each scheduled activity may be associated with a work item such as work item 109A which includes corresponding unique context information 108A. The scheduling includes adding work item 109A to an execution stack that keeps track of when each work item is to be executed. It should be noted that the term "stack," as used herein, may refer to any type of logical data structure including a traditional stack (an abstract data type and data structure based on the principle of Last In First Out (LIFO)), a queue or any other type of data structure configured to order information. Scheduling also includes tracking pending activity work items (pending in the execution stack) to determine when the scheduled activity has reached one of many different completed states.

Figure 4:
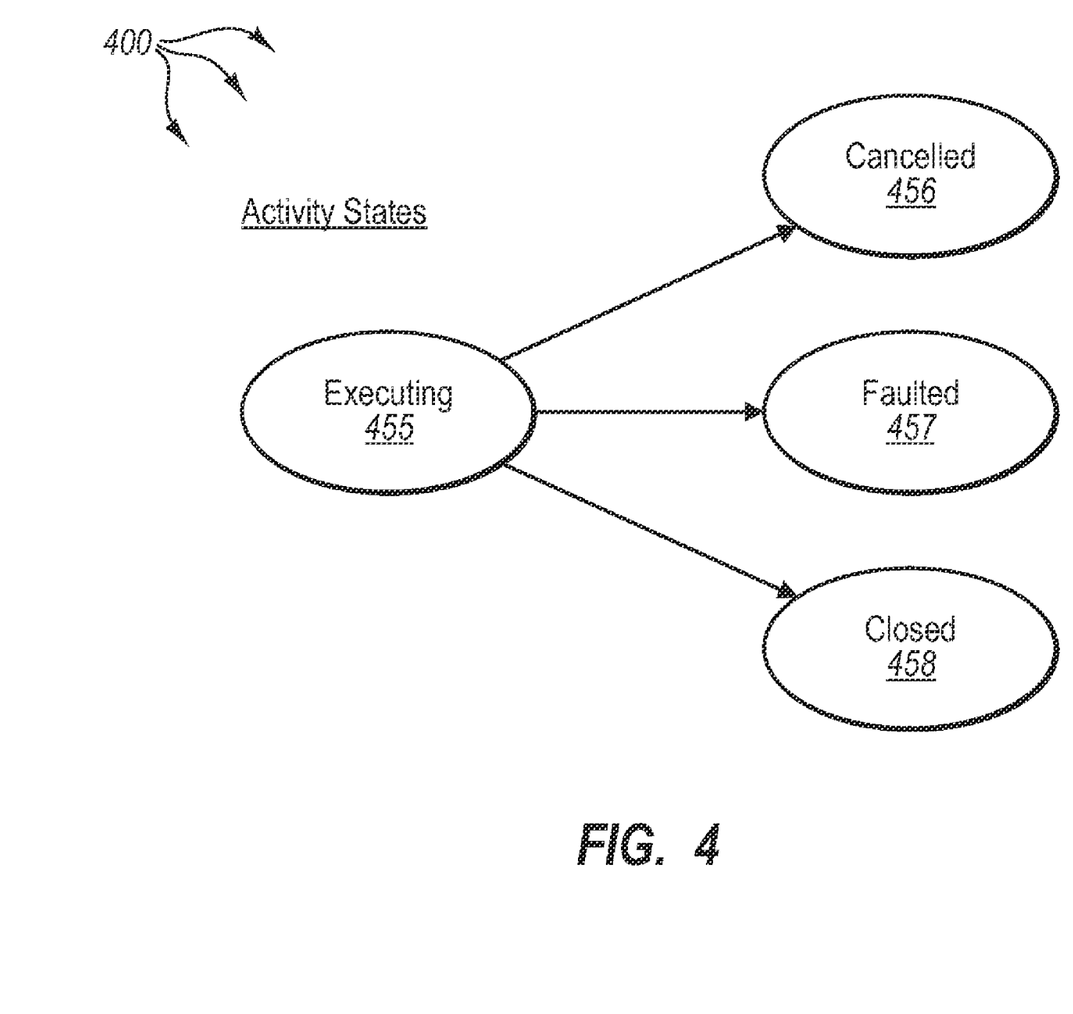
FIG. 4 illustrates embodiments of possible activity states.

For instance, as illustrated in FIG. 4, activities can end in at least three different completed states: cancelled 456, faulted 457 and closed 458. During or after execution (e.g. state 455), the execution may be cancelled. This may be the result of a user indicating that execution is to stop or because the program has initiated the cancellation. Detailed policies regarding cancellation may be implemented where such policies dictate what to do when program execution is cancelled. Program execution may also be subject to execution errors or faults, resulting in execution ending in a faulted state. If the program executes successfully, it will reach a closed or completed state, indicating that the program has been successfully executed. Because, at least in some embodiments, the scheduler is designed to track pending and executing activities, the author of the activity does not have to signal to the runtime 115 when each activity completes. This eliminates inconsistent state, problems involving a failure to notify the runtime of completion and other problems.

Method 200 also includes an act of resolving the scheduled activity's arguments and variables prior to invoking the scheduled activity using the activity's unique context (act 230). For example, resolving module 122 may be configured to resolve the scheduled activity's (e.g. 107) arguments and variables prior to invoking the scheduled activity using the activity's unique context 108A. Each activity may include arguments and/or variables which are resolved prior to execution. The runtime may be configured to resolve these arguments/variables with the aid of unique context information indicating the data model of the activity's workflow 106. In some cases, the arguments/variables may be resolved in a serial, deterministic fashion; whereas, in other cases, the arguments/variables may be resolved in a parallel, non-deterministic fashion. It should also be noted that these variables/argument may resolve to values that are included in the scheduled activity's context (e.g. 108A) for use by its implementation body.

Method 200 includes an act of determining, based on the activity's unique context, if the scheduled activity comprises at least one work item that is to be queued at the top of the execution stack (act 240). For example, queue determining module 123 may be configured to determine, based on activity 107's unique context information 108A, whether the scheduled activity includes at least one work item 109A that is to be queued at the top of the execution stack. For instance, some work items have a higher importance level, and execution for such work items is more urgent. In other cases, long running activities may have work items that were stopped and stored, waiting for another program or person to indicate that the work item is to be reloaded and processed. In such cases, a reloaded work item may be queued to the top of the execution stack. Many other scenarios exist that would call for queuing one work item over another. Such queuing priority information may be included in context information 108A or may be stored in a data store accessible by queue determining module 123.

Method 200 includes, based on the determination, an act of queuing the at least one work item into the execution stack (act 250). For example, based on the above determination in act 240, queuing module 124 may be configured to queue the high priority work item to the top of the execution stack. Accordingly, work items may be dynamically queued higher or lower in the execution stack based on associated context information, based on policy determinations, or based on input received from a user or other program that a work item is to be moved within the execution stack.

Method 200 includes an act of executing the work items of the scheduled activity as queued in the execution stack of the established execution environment in the CBR (act 260). For example, activity execution module 130 may be configured to execute the work items of the scheduled activity 107 as queued in the execution stack of the established execution environment in CBR 110. Thus, each work item of the activity may be individually and dynamically scheduled for execution. The scheduler can thus maintain an accurate accounting of which activities have completed execution, which are still pending execution or which have terminated in a faulted or cancelled fashion. This ensures that the execution of each activity is competently managed, even in cases of long-running activities and activities that terminate in an unexpected fashion.

In some embodiments, CBR 115 may be configured to implement a workflow thread for activity execution, such that each activity (and corresponding work item(s)) is executed as part of a workflow on the workflow thread. In some instances, only one activity has a workflow thread at a time. In other cases, the activity may be executed on a plurality of logical threads, while the execution is still on the same physical thread. Additionally or alternatively, the activity may be executed on a plurality of logical threads, while the execution is on separate physical threads. Thus, multiple physical threads may be used simultaneously.

As indicated above and as illustrated in FIG. 3, scheduler 320 may take into account various considerations when scheduling various activities or work items for execution. For instance, policies (sometimes referred to as contracts) may govern activity execution, dictating how, when and by whom an activity is to be executed. Policies may also govern activity continuation and how various work items are chained together. Policies concerning activity completion may also be implemented describing how to indicate whether the entire program or portions thereof are complete and what state they completed in. Policies may also govern activity cancellation, describing how to indicate that a running program is to be stopped. Moreover, policies may govern how exceptions, errors and other faults are to be handled during execution. Many other policies governing how activity scheduling or activity execution are to be performed are possible. The examples and descriptions below are not intended to limit the potential policies to those listed below; rather, they describe embodiments usable in the established execution environment.

Accordingly, in some embodiments, the scheduler 320 includes a policy mechanism configured to provide changeable settings that are applied before, during or after activity execution. In one example, a policy regarding activity cancellation identifies one or more settings indicating what is to occur upon receiving a cancellation signal from a user. The activity cancellation policy settings identify whether the activity can be cancelled immediately or whether cancellation can be postponed. The activity cancellation policy also indicates whether to ignore or acknowledge the cancellation signal. In cases where it is determined that the cancellation request was ignored, the runtime may then determine whether the activity reached at least one of the completed states. Such a determination would provide an indication of why the cancellation request was ignored.

Another activity execution policy regarding activity execution includes a priority setting indicating how the execution of various types of work items is to be prioritized. In one case, at least one of the priority settings indicates that when a child activity's execution completes, the child's parent's handler associated with that completion is configured to be the next activity queued for execution. Other settings may include other prioritization items such as an indication that when a parent activity schedules a child for execution, that child will be the next activity to execute. Moreover, another prioritization setting may indicate that a sequence of non-blocking activities may execute as a single unit as opposed to being interleaved with other activities in a parallel execution. Many other prioritization settings are possible and the above examples are provided for exemplary purpose only.

Such prioritization settings may allow for immediate fault signal propagation. Since the fault callback is pushed and (at least in some cases) the default behavior is to propagate the fault, the fault may find a fault handler (or the host's unhandled exception handler) before any other work items are run. Moreover, such prioritization settings may allow for immediate cancel signal propagation, such that a cancel signal propagates, by default, to all leafs before any other work items are run.

Another type of policy may include a policy regarding activity cancellation that identifies one or more default settings indicating what is to occur by default upon receiving a cancellation signal from a user. The default activity cancellation policy settings identify that the scheduled activity is to be cancelled only when the activity has no outstanding child activities, no pending asynchronous operations and no pending work items, and that if there are outstanding child activities, the cancellation signal is to be propagated to the child activities.

An exception handling policy may identify one or more settings indicating what is to happen when an exception occurs, where the exception handling settings identify the appropriate mechanism for signaling that an exception occurred, model options for proposing solutions corresponding to the error that occurred, and identify whether or not to propagate the error to other entities or programs. In some cases, an exception handling policy may identify one or more settings for synchronous fault propagation, where the settings identify that if one of the scheduled activity's work items throws an exception, the scheduled activity is to be aborted, the scheduled activity is moved to a faulted state, completion callback is scheduled for the scheduled activity, and fault propagation is initiated. In other cases, the policy regarding exception handling identifies one or more settings indicating what is to happen when an (otherwise) unhandled fault occurs, where the exception handling settings identify appropriate options for handling the fault when nothing in the CBR 115 is otherwise designed to handle the fault. This ensures that the CBR never enters an infinite processing loop.

In another example, a policy regarding activity continuation may identify settings indicating what is to happen when an activity is determined to be in an idle state including what kind of inputs are or are not allowed in the idle state, how the idle state is signaled and how the activity's idle state affects associated outstanding work items. The policy may also dictate what constitutes an idle state for any given activity or work item.

Another example of a policy includes a policy regarding activity execution that identifies one or more isolation mechanism settings indicating that only work items inside a predefined isolation block work items can be scheduled or executed. Accordingly, an activity or workflow author can define an isolation block such that only items in that block can be scheduled or executed. Thus, in cases where two activities are running in parallel and deterministic execution is desired, different levels of isolation may be provided such that boundaries may be implemented other activities running on other logical threads do not interfere with the currently running activities.

An alternative activity execution policy may identify one or more activity execution settings indicating that if the work items associated with the scheduled activity implement volatile resources, then the CBR is not to persist data associated with those volatile resources while those volatile resources are in use. Accordingly, policy may indicate that changeable resources such as, for example, HTTP or database connections or other changeable resources are not to be persisted, as the stored information changes and quickly becomes obsolete.

In some embodiments, each policy 328 includes default policy settings. These default settings may be overridable by a user 350. Policies may allow bookmarks to be incorporated such that activity's work items can be suspended and resumed at the bookmarked point. In some cases, where activities are resumable at a bookmarked point, the resuming of such activities may be indicated internally through an internal signal (internal to the runtime) or externally from an external signal outside the runtime.

Accordingly, policies may be dynamically implemented to govern how the continuation-based runtime operates. Policies may be added or removed or changed on-the-fly. The policies may affect any one or more of the modules in CBR 110 and may thus govern runtime operation. Establishing such an execution environment may allow for activities and their associated work items to be scheduled and processed in a complete and predictable fashion, regardless of whether the activities are long running, stored and reloaded, run on multiple threads (physical or logical) or otherwise altered by dynamic policy application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for establishing an execution environment for executing activities in a continuation based runtime, the method comprising:

an act of establishing an execution environment for executing activities in a continuation based runtime (CBR), wherein establishing the execution environment comprises instantiating an activity scheduler that is configured to perform the following:

an act of scheduling an activity for execution in the CBR, wherein the scheduled activity is associated with one or more work items and unique context information corresponding to the work items, the scheduling including adding the one or more work items to an execution stack and tracking pending activity of the one or more work items to determine when the scheduled activity has reached at least one of a plurality of completed states;

an act of resolving arguments and variables of the scheduled activity prior to invoking the scheduled activity using the scheduled activity's unique context;

an act of determining, based on the scheduled activity's unique context, that the scheduled activity comprises at least one work item that is to be queued at the top of the execution stack; and based on the determination, an act of queuing the at least one work item to the top of the execution stack; and an act of executing the one or more work items of the scheduled activity as queued in the execution stack of the established execution environment in the CBR, including executing the one or more work items of the scheduled activity without process affinity, by at least:

executing a particular work item of the scheduled activity on a first process;

pausing execution of the particular work item; and subsequent to pausing execution of the particular work item, resuming execution of the particular work item on a second, different, process.

2. The method of claim 1, wherein the scheduler includes a policy mechanism that is configured to provide changeable settings that are applied during activity execution.

3. The method of claim 2, wherein the policy mechanism includes policies for one or more of the following: activity execution, activity continuation, activity completion, activity cancellation, or exception handling.

4. The method of claim 3 wherein the policy regarding activity cancellation identifies one or more settings that indicate what is to occur upon receiving a cancellation signal from a user, the activity cancellation policy settings identifying whether the activity can be cancelled immediately or whether cancellation can be postponed and whether to ignore the cancellation signal or acknowledge the cancellation signal.

5. The method of claim 4, wherein upon determining that the cancellation signal was ignored, the method further comprises an act of determining whether the activity reached at least one of the plurality of completed states.

6. The method of claim 3, wherein the policy regarding activity cancellation identifies one or more default settings that indicate what is to occur by default upon receiving a cancellation signal from a user, the default activity cancellation policy settings identifying that:

the scheduled activity is cancelled only when the activity has no outstanding child activities, no pending asynchronous operations, and no pending work items, and if there are outstanding child activities, the cancellation signal is to be propagated to the child activities.

7. The method of claim 3, wherein the policy regarding exception handling identifies one or more settings that indicate what is to happen when an exception occurs, the exception handling settings identifying:

the appropriate mechanism for signaling that an exception occurred, modeling options for proposing solutions corresponding to an error that occurred, and whether or not to propagate the error to other entities or programs.

8. The method of claim 3, wherein the policy regarding exception handling identifies one or more settings for synchronous fault propagation, the settings identifying that if one of the scheduled activity's work items throws an exception, the scheduled activity is aborted, the scheduled activity is moved to a faulted state, completion callback is scheduled for the scheduled activity, and fault propagation is initiated.

9. The method of claim 3, wherein the policy regarding exception handling identifies one or more settings that indicate what is to happen when an unhandled fault occurs, the exception handling settings identifying one or more appropriate options for handling the fault when nothing in the CBR is designed to handle the fault.

10. The method of claim 3, wherein the policy regarding activity continuation identifies one or more settings that indicate what is to happen when an activity is determined to be in an idle state, including indicating what kind of inputs are or are not allowed in the idle state, how the idle state is signaled, and how the activity's idle state affects associated outstanding work items.

11. The method of claim 3, wherein the policy regarding activity execution identifies one or more isolation mechanism settings that indicate that only work items inside a predefined isolation block can be scheduled or executed.

12. The method of claim 3, wherein the policy regarding activity execution identifies one or more activity execution settings that indicate that if the work items associated with the scheduled activity implement volatile resources, then the CBR is not to persist data associated with those volatile resources while the volatile resources are in use.

13. The method of claim 3, wherein each policy includes default policy settings that are overridable by a user.

14. The method of claim 1, further comprising an act of implementing a workflow thread for activity execution, wherein only one activity has a workflow thread at a time.

15. The method of claim 14, wherein the activity is executed on a plurality of logical threads, while the execution environment executes on the same physical thread.

16. The method of claim 3, wherein the policy regarding activity continuation identifies one or more settings that indicate that bookmarks can be incorporated, such that the scheduled activity's work items can be suspended and resumed at the bookmarked point.

17. The method of claim 3, wherein the policy regarding activity execution includes a priority setting that indicates how the execution of various types of work items is to be prioritized, wherein at least one of the priority settings indicates that when a child activity's execution completes, the child's parent's handler that is associated with that completion is configured to be the next activity that is queued for execution.

18. A computer program product for implementing a method for establishing a performant, predictable execution environment for executing activities in a continuation based runtime, the computer program product comprising one or more physical storage devices having stored thereon computer-executable instructions that, when executed by one or more processors of the computing system, cause the computing system to perform the method, the method comprising:

an act of establishing an execution environment for executing activities in a continuation based runtime (CBR), wherein establishing the execution environment comprises instantiating an activity scheduler, the scheduler including a policy mechanism that is configured to provide configurable settings that are applied during activity execution, the scheduler being configured to perform the following:

an act of scheduling an activity for execution in the CBR according to one or more settings defined in an activity execution policy, wherein the scheduled activity is associated with one or more work items and unique context information corresponding to the work items, the scheduling including adding the one or more work items to an execution stack and tracking pending activity of the one or more work items to determine when the scheduled activity has reached at least one of a plurality of completed states;

an act of resolving arguments and variables of the schedule activity prior to invoking the scheduled activity using the scheduled activity's unique context;

an act of determining, based on the scheduled activity's unique context, that the scheduled activity comprises at least one work item that is to be queued at the top of the execution stack; and based on the determination, an act of queuing the at least one work item to the top of the execution stack; and an act of executing the one or more work items of the scheduled activity as queued in the execution stack of the established execution environment in the CBR and according to the activity execution policy, including executing the one or more work items of the scheduled activity without process affinity, including:

executing a particular work item of the scheduled activity on a first process;

pausing execution of the particular work item; and subsequent to pausing execution of the particular work item, resuming execution of the particular work item on a second, different, process.

19. The computer program product of claim 18, wherein the completed states include at least one of closed, cancelled, or faulted.

20. A computer system comprising the following:

one or more processors;

system memory;

one or more computer-readable storage media having stored thereon computer-executable instructions that, when executed by the one or more processors, causes the computing system to perform a method for establishing an execution environment for executing activities in a continuation based runtime, the method comprising the following:

an act of establishing an execution environment for executing activities in a continuation based runtime (CBR), wherein establishing the execution environment comprises instantiating an activity scheduler that is configured to perform the following:

an act of scheduling an activity for execution in the CBR, wherein the scheduled activity is associated with one or more work items and unique context information corresponding to the work items, the scheduling including adding the one or more work items to an execution stack and tracking pending activity of the one or more work items to determine when the scheduled activity has reached at least one of a plurality of completed states;

an act of resolving arguments and variables of the scheduled activity prior to invoking the scheduled activity using the scheduled activity's unique context;

an act of determining, based on the scheduled activity's unique context, that the scheduled activity comprises at least one work item that is to be queued at the top of the execution stack; and based on the determination, an act of queuing the at least one work item to the top of the execution stack; and an act of executing the one or more work items of the scheduled activity as queued in the execution stack of the established execution environment in the CBR, including executing the one or more work items of the scheduled activity without process affinity, including:

executing a particular work item of the scheduled activity on a first process;

pausing execution of the particular work item; and subsequent to pausing execution of the particular work item, resuming execution of the particular work item on a second, different, process.

\* \* \* \* \*